United States Patent [19]
Wood

[11] Patent Number: 5,838,372
[45] Date of Patent: Nov. 17, 1998

[54] PHASE CLOCK DRIVE CIRCUIT AND METHOD FOR REDUCTION OF READOUT NOISE IN CCDS

[75] Inventor: Mark Wood, Broomfield, Colo.

[73] Assignee: Ohmeda Inc., Liberty Corner, N.J.

[21] Appl. No.: 706,856

[22] Filed: Sep. 3, 1996

[51] Int. Cl.[6] .............................. H04N 3/14; H04N 5/217
[52] U.S. Cl. ......................... 348/312; 348/241; 348/317
[58] Field of Search .................................. 348/317, 311, 348/241, 243, 250, 312, 294, 297, 298, 316, 319; 257/242, 243, 231

[56] References Cited

U.S. PATENT DOCUMENTS

| | | | |
|---|---|---|---|
| 4,324,988 | 4/1982 | Takemura et al. | 257/231 |
| 4,583,003 | 4/1986 | Kimata | 348/312 |
| 4,651,215 | 3/1987 | Bell et al. | 348/312 |
| 4,680,636 | 7/1987 | Ooi | 348/317 |
| 4,716,317 | 12/1987 | Spierings | 307/520 |
| 4,761,565 | 8/1988 | Kannegundla | 307/243 |
| 4,954,900 | 9/1990 | Frame | 348/317 |
| 5,237,422 | 8/1993 | Kannegundla et al. | 358/213.11 |
| 5,452,003 | 9/1995 | Chamberlain et al. | 348/312 |
| 5,483,283 | 1/1996 | Kannegundla | 348/312 |

*Primary Examiner*—Wendy Garber
*Assistant Examiner*—Luong Nguyen
*Attorney, Agent, or Firm*—Roger M. Rathbun

[57] ABSTRACT

The present invention is directed to a charge coupled device in which, during the shifting interval, the charge storage pixels are biased with an electrical potential greater than the absolute value of the CCD inversion potential and, during the charge integration interval, the charge storage pixels are biased with an electrical potential that is less than the CCD inversion potential. In this manner, the present invention substantially reduces error attributable to impact ionization or dark current.

28 Claims, 9 Drawing Sheets

PHASE CLOCK DRIVE CIRCUIT AND METHOD FOR REDUCTION OF READOUT NOISE IN CCDS

FIELD OF THE INVENTION

The present invention relates generally to phase clock drive circuitry for charge-coupled devices ("CCDs"), and is particularly apt for CCDs employed in spectrometers for gas analysis, especially anesthetic/respiratory gas analysis in the medical industry.

BACKGROUND

CCDs are used in a variety of applications, such as spectrometry, imaging, digital memories, various logic functions, and signal processing, for accumulating, storing and/or transferring electrical charges. The basis of a typical CCD is the dynamic storage and withdrawal of electrical charge in a series of metal-oxide-semiconductor ("MOS") capacitors. To define the MOS capacitors, the CCD may include a number of metal gate electrodes positioned adjacent to an oxide-semiconductor substrate. In response to an applied electrical potential, a depletion region is formed under a gate electrode, and the surface potential increases considerably under a gate electrode, thereby forming a potential well under the gate electrode. The potential well is used for the accumulation and/or storage of electrical charge. The substrate further includes a number of channel stops for laterally confining the stored electrical charge(s) in a number of channels, each containing a plurality of potential wells.

To transfer electrical charge(s) within each channel, adjacent gate electrodes are biased with different electrical potentials to create adjacent potential wells of different depths. The electrical charges move along the channels from shallower potential wells beneath gate electrodes having a low electrical potential to deeper potential wells beneath gate electrodes having a high electrical potential. By alternately biasing adjacent gate electrodes at timed high and low electrical potentials, electrical charges can be sequentially shifted down the channels for processing and/or collection.

In CCD applications such as imaging and spectroscopy, charges are accumulated in the potential wells during an integration period. The charge results from photons of radiation contacting a radiation-sensitive substrate. The amount of charge accumulated in each potential well is a function of the incident radiation intensity and the duration of exposure.

False charge (i.e., noise) can form in the potential wells of a CCD by a number of mechanisms, thereby reducing the signal to noise ratio and responsiveness and/or accuracy of the CCD. Specifically, false charge can be generated during charge shifting by impact ionization. Impact ionization occurs when holes from the channel stops collide with atoms in the channel material in response to changes in the electrical potential applied to define a potential well, creating electron-hole pairs (a process known as impact ionization). The resulting electron charge, commonly known as "spurious" charge, is a source of shot noise when collected in the potential wells. Spurious charge generating holes are drawn into the channels whenever the gate electrode potentials are driven below the CCD inversion potential.

False charge can also be thermally generated. This "dark" charge collects in the potential wells resulting in additional shot noise. Dark charge generation can be reduced by driving the gates below the CCD inversion potential. This is typically done during the integration period. Since holes are drawn into the channels during inversion, it is desirable to keep the gates above inversion during charge shifting. Unfortunately this also results in increased dark charge generation and thus a trade-off must be made in attempting to minimize the overall false charge generated during charge shifting.

In applications where CCDs are utilized for imaging, the total CCD shift/charge readout period is typically long relative to the charge integration period because the charge is serially output pixel by pixel. The charge is typically shifted pixel row by pixel row into a horizontal shift register which outputs the pixel charges serially. CCDs used for imaging are known to be held at a potential below the CCD inversion potential during both shifting and inversion, thereby reducing the dark current in the channels during the relatively long charge shift/readout period.

In applications such as spectrometry, CCDs have a relatively short charge shift/readout period relative to the integration period because the accumulated charge(s) in a given channel (i.e., the individual charges from a plurality of pixel rows) are combined in a horizontal shift register) and then serially transferred out. The combination or summation of the charges on a channel-by-channel basis is commonly known as "binning." Binning essentially reduces the CCD array to a linear array of multiple columns. Each column is thereby used to detect a discrete interval of spectra. However, since charge is collected for an entire column, requiring a shift for each row, the spurious charge collected is magnified by the number of rows. This is in comparison to an imaging array wherein only one vertical shift occurs per pixel. In low signal spectroscopy the total spurious charge collected after binning can be substantial and degrades the signal to noise ratio. It is therefore imperative that spurious charge be minimized during shifting. It is also necessary to minimize dark charge generation. It would be desirable to operate the vertical shifting at a high speed to minimize dark charge generation while maintaining the gate potentials above inversion to minimize spurious charge generation.

SUMMARY

It is an objective of the present invention to provide a phase clock drive circuit that reduces noise, thereby enhancing the accuracy, responsiveness and/or reliability of the CCD.

More particularly, it is an object to provide a CCD drive circuit with reduced noise from impact ionization and dark current. The realization of this objective is especially desirable for CCDs in which the stored electrical charges are relatively small, combined during binning, and/or shifted at a high frequency, such as spectroscopy CCD applications in the medical field (e.g., for anesthetic/respiratory gas analysis).

A further objective is to provide CCD phase clock drive circuitry that is relatively simple, inexpensive, and reliable, can operate at high sampling frequencies, and can produce a high signal to noise ratio for the CCD.

These and other objectives are addressed by the apparatus and method of the present invention for reducing readout noise in CCDs. The present invention utilizes a new architecture in the phase clock driver circuitry to substantially reduce the total amount of false charge from impact ionization and dark current. False charge from impact ionization is substantially reduced by maintaining, during the time required for charge shifting (i.e., the shifting interval ("$T_S$")), the absolute value of the CCD potential at level(s) above the absolute value of the CCD inversion potential. Further, for CCDs used in applications involving charge integration (i.e., charge accumulation in response to incident radiation), and particularly spectroscopy, the invention further contemplates reducing false charge from dark current by maintaining, substantially throughout the time required for charge integration (i.e., the integration interval ("$T_C$")), the absolute value of the CCD potential at level(s) below the absolute value of the CCD inversion potential. In this manner, the phase clock drive circuitry of the present invention provides a CCD that is reliable and has a high degree of accuracy. The circuitry itself is relatively simple, inexpensive, and reliable, can operate at a high speed, and can produce a relatively high signal to noise ratio for the CCD. In medical applications in particular, the consequent accuracy and reliability of spectrometers using such CCDs yields enhanced responsiveness and reliability for health care personnel.

The phase clock driver circuitry of the present invention, includes: (i) means for receiving a timing signal having a first portion and a second portion; (ii) means for converting the timing signal into a drive signal having a first portion applying a shifting potential(s) to the CCD and, in a charge integration application, a second portion applying an integration potential to the CCD; and (iii) coupling means for use in delivering the drive signal to the CCD. The first portion of the timing signal includes a train of timing pulses having a peak pulse value and a baseline value and the second portion of the timing signal has a substantially constant magnitude. To inhibit impact ionization during charge shifting/readout, the absolute value of the shifting potential is maintained above the absolute value of the predetermined CCD inversion potential. To inhibit dark current during charge integration, the absolute value of the inversion potential, "$V_L$," is maintained substantially below the absolute value of the predetermined CCD inversion potential. For integration applications, the first portion of the drive signal corresponds to the shifting interval and the second portion to the integration interval.

The shifting potential includes at least a first voltage level, "$V_H$," which is applied to a first portion of the gate electrodes when a timing pulse has a peak pulse value, and a second voltage level, "$V_P$," which is applied to a second portion of the gate electrodes when the other timing pulse has the baseline potential value. Both shifting voltage levels have absolute values exceeding the absolute value of the CCD inversion potential with the absolute value of the first voltage level exceeding the absolute value of the second voltage level. In one embodiment, the two voltage levels are used for alternately biasing adjacent gate electrodes in the CCD to transfer charge down each channel via adjacent potential wells.

The converting means can include at least one wave shaping means (e.g., wave shaping circuit) having a variable time constant for incorporating the integration potential into the second portion of the driving signal, also referred to herein as the output waveform. The wave shaping means switches between a relatively short time constant and a relatively long time constant based on the magnitude of an applied signal. The relatively long time constant is greater than a substantially constant period between successive timing pulses and less than the length of the second portion of the timing signal.

By way of example, the converting means can include energy storing means (e.g., a capacitor) and means for applying the first voltage level to the energy storing means each time the timing signal reaches the peak pulse value so that the energy storing means charges to substantially the first voltage level.

The wave shaping means can include a diode operatively interconnected to the energy storing means to the wave shaping means each time the timing signal reaches the baseline value so that the diode is biased "on" when the energy storing device discharges through the wave shaping means. The potential across the energy storing device exceeds a sum of the second voltage level and a potential across the diode while biased "on."

The wave shaping means can further include a resistor means having a predetermined resistance operatively interconnected to a voltage source having a potential substantially equal to the substantially constant potential value of the second portion of the drive signal. The predetermined resistance of the resistor means is greater than a resistance of the diode while the diode is biased "on."

To perform shifting, one embodiment of the CCD includes the steps of: (i) first applying, in response to a first timing pulse, the first voltage level (which is above the CCD inversion potential) to a first set of gate electrodes and the second voltage level (which is also above the CCD inversion potential) to a second set of gate electrodes, with the gate electrodes in the first set differing from the gate electrodes in the second set, to shift the electrical charge from a potential well defined by a gate electrode in the second set to a potential well defined by a gate electrode in the first set; and (ii) second applying, in response to a second timing pulse following the first timing pulse, the first voltage level to the second set of gate electrodes and the second voltage level to the first set of gate electrodes to shift the electrical charge from a potential well defined by the gate electrode in the first set to a potential well defined by the gate electrode in the second set. These steps are repeated as many times as necessary to shift the electrical charge alternately between potential wells defined by gate electrodes in the first and second sets until the charge is in a desired location (e.g., in the horizontal shift register).

The CCD is particularly useful in a gas spectrometer. The gas spectrometer includes: (i) a first and second radiation sensing means (e.g., including one or more potential wells in the CCD pixel array) for generating, during the integration time interval, electrical charges in proportion to radiation received by each of the radiation sensing means during the integration interval; (ii) a charge storage pixel (e.g., a potential well(s) in the horizontal shift register) for holding a first and second electrical charge generated by each of the first and second radiation sensing means; (iii) coupling means (e.g., the gate electrodes and conductors connecting the gate electrodes to the driver circuit) for use in delivering a drive signal to the CCD to enable the transfer, during the shifting interval, of the first and second electrical charges to the charge storage pixel in response to an electrical potential applied to the radiation sensing means; and (iv) phase clock driving means (e.g., driver circuit) for providing the drive signal to the coupling means. As noted above, the drive signal applies to the radiation sensing means and charge storage pixels an integration potential during the integration time interval and a shifting potential during the shifting time interval. The absolute value of the integration potential is less than the absolute value of the CCD inversion potential, and the absolute value of the shifting potential is more than the absolute value of the inversion potential.

In one embodiment, the spectrometer includes an array of radiation sensing means to receive radiation having a plurality of wavelengths. The array includes a first plurality of radiation sensing means corresponding to a first predetermined portion of the wavelength range and a second plurality of the radiation sensing means corresponding to a second predetermined portion of the wavelength range, with the first and second predetermined portions being different. To accommodate the electrical charges from each of the ranges, the CCD includes a first and second charge storage pixel, with each charge storage pixel corresponding to either the first or second plurality of radiation sensing means. In this manner, the first and second plurality of radiation sensing means can monitor simultaneously and independently different radiation wavelength ranges.

DETAILED DESCRIPTION OF THE INVENTION

The CCD of the present invention substantially reduces false charge formation by reducing impact ionization and dark current. The phase clock driver circuitry of the CCD substantially eliminates spurious charge formation and accumulation in the potential wells caused by impact ionization by maintaining a shifting potential having two voltage levels, the first voltage level "$V_H$" and the second voltage level "$V_I$", in the CCD gate electrodes. The absolute value of two voltage levels are each above the absolute value of the CCD inversion potential. The phase clock driver circuitry reduces false charge formation and accumulation in the potential wells caused by dark current by maintaining an integration potential "$V_L$" having an absolute value less than the absolute value of the CCD inversion potential.

The phase clock driver circuitry can be employed in a variety of CCD applications, including spectrometry, imaging, digital memories, various logic functions and signal processing. Of primary significance, the CCD is particularly apt for medical gas spectroscopy, though the driver circuitry is equally applicable to CCDs and other charge transfer devices used in numerous other applications.

Figure 1:
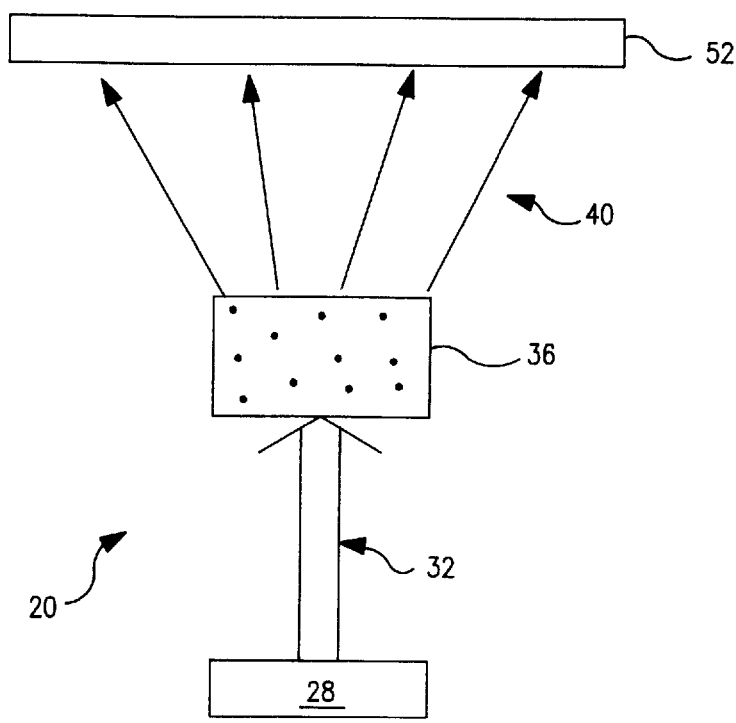
FIG. 1 is a schematic of a spectrometer according to an embodiment of the present invention.
Figure 2:
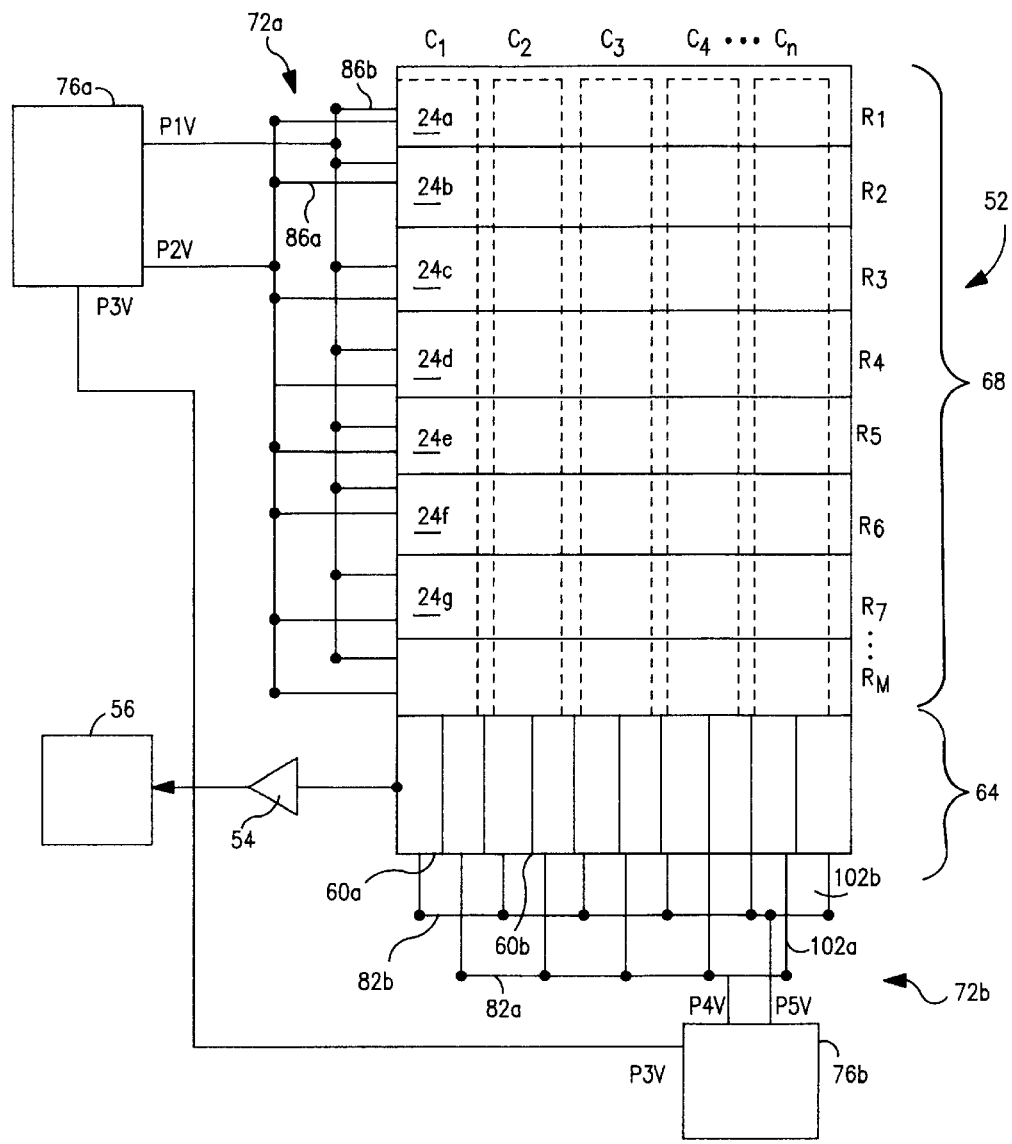
FIG. 2 is a diagrammatic illustration of a CCD in accordance with the present invention.

FIGS. 1 and 2 depict an embodiment of a CCD used in Raman spectrometry. The spectrometer 20 includes an emitter 28 for providing radiation 32 through a gas sample 36 to yield scattered radiation 40 that is scattered according to wavelength, a CCD 52 for receiving and converting the scattered radiation 40 into corresponding electrical charge (s), and an amplifying means 54 for amplifying an output signal from the CCD. The signal includes portions corresponding to the accumulated electrical charges in the columns $C_1$ through $C_n$ of the CCD, and a signal processing means 56 for using the output signal to determine gas component concentrations.

The CCD 52 includes an n×m array 68 of radiation sensing means or pixels 24, a number of charge storage pixels 60 in a horizontal shift register 64, amplifying means 54, signal processing means 56, coupling means 72a,b for applying a drive signal to the radiation sensing means 24 and to charge storage pixels 60 for transferring vertically the electrical charges stored in the radiation sensing means 24 to the charge storage pixels and for transferring horizontally the charges from the charge storage pixels serially to the amplifying means 54. The radiation sensing means includes a radiation-sensitive substrate 80 for forming electrical charge in response to incident radiation and gate electrodes 84 for defining a potential well. Like the radiation sensing means 24, the charge storage pixel includes vertically oriented gate electrodes (not shown) for defining a potential well for storing electrical charge. The charge storage pixel device is typically shielded from incident radiation by a light impervious or absorbing barrier. From the charge storage pixels, the charges are transferred to the signal processing means 56. To transfer the electrical charges, the phase clock driving means 76a,b provides the various electrical potentials, "$V_L$," "$V_I$," and "$V_H$," to the coupling means 72a,b.

Figure 3:
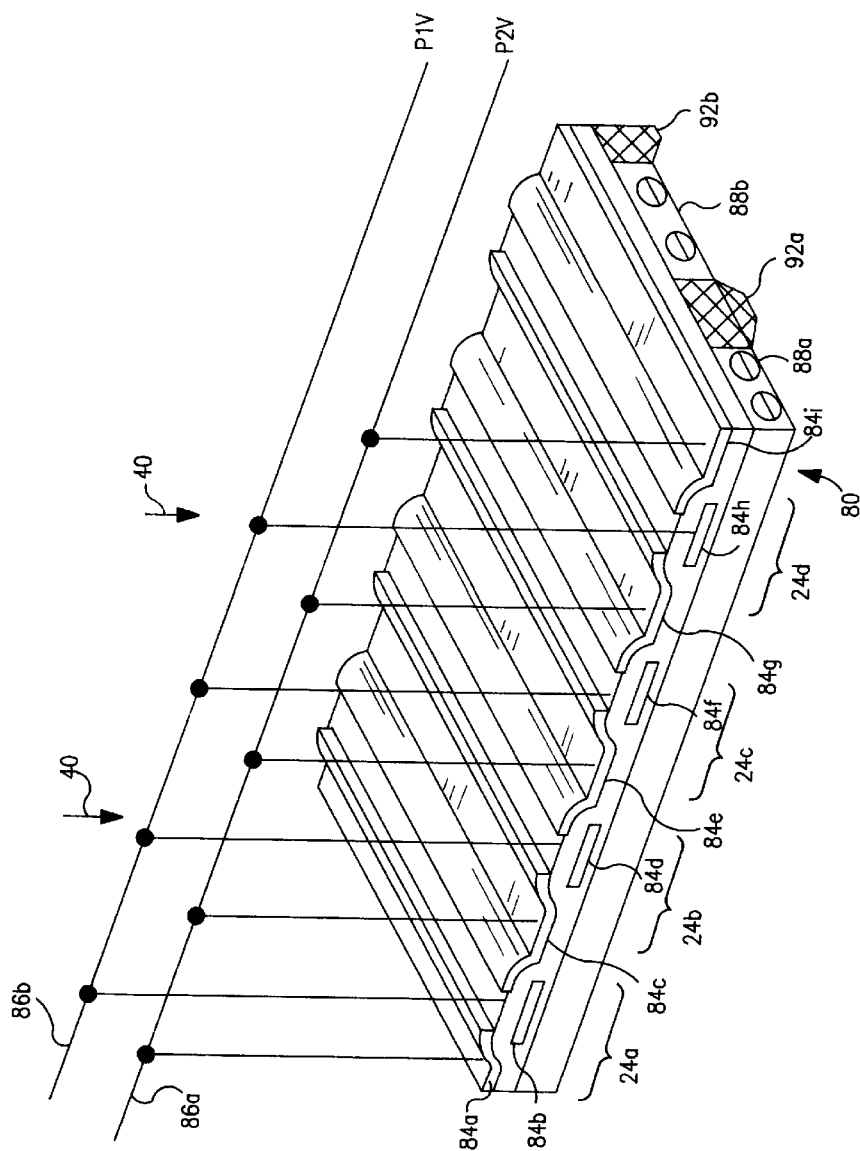
FIG. 3 is a diagrammatic illustration, in perspective, of a portion of the CCD of FIG. 1.

Referring now to the perspective view of FIG. 3, which is a partial cross-sectional view of the array 68 in FIG. 1, the plurality of radiation sensing means 24 are formed on a common radiation-sensitive oxide-semiconductor substrate 80. As will be appreciated, other configurations of CCDs are equally suitable for the present invention. Each radiation sensing pixel 24a,b,c,d is adjacent to and is defined by one or more shifting gate electrodes 84a–i connected by conductors 86a,b to phase clock driving means 76a for applying a shifting potential to the radiation sensing means to shift the electrical charges stepwise among the potential wells defined by the electrodes along channels 88a,b. By way of example, the substrate 80 can be an oxide covered silicon substrate and the gate electrodes 84a–i can be fabricated from semi-transparent polycrystalline silicon. Alternatively, the gate electrodes can be located on the reverse side of the substrate 80 to avoid blocking scattered radiation. The accumulation of charge within the substrate 80 is a function of the radiation intensity and duration of exposure (i.e., the desired charge integration time interval).

The radiation sensing pixels 24 are arranged on the substrate 80 in a plurality of rows ($R_1$ through $R_M$) and columns ($C_1$ through $C_n$) of radiation sensing pixels 24 which collectively form the n×m array. Each radiation sensing pixel 24 is defined by one or more horizontally oriented gate electrodes 84 depending upon the number of phases of the CCD. A number of side-by-side, vertically oriented charge accumulation and transfer channels 88a,b are defined and separated from each other within the substrate 80 by a plurality of channel stop regions 92a,b to form the columns of the radiation sensing means.

Returning to FIG. 2, each of the charge storage pixels 60 in the lower portion of the radiation-sensitive substrate 80 are adjacent to a number of vertically oriented gate electrodes (not shown) connected by conductors 102a,b to the phase clock driving means 76b, (with the number of gate electrodes in a charge storage pixel depending on the number of phases of the CCD), to form a horizontal shift register 64. The number of charge storage pixels 60 in the horizontal shift register is equal to the number of columns in the array. The horizontal shift register provides the cumulative electrical charges in each column serially to the amplifier 54.

Coupling means 72a includes the vertical shifting gate electrodes 84 and the conductors 86a,b, and the coupling means 72b includes the horizontal shifting gate electrodes and the conductors 102a,b. The coupling means 72a,b are operatively coupled with the corresponding controller means 76a,b. Each of the controller means 76a,b includes the driver circuits shown in FIGS. 4A and B, respectively. Each of the circuits are discussed below.

In the embodiment, the driver circuits are two-phase circuits which generate waveforms using the electrical potentials, $V_H$, $V_I$, and $V_L$. The absolute value of $V_L$ is below the CCD inversion potential while the absolute values of both $V_H$ and $V_I$ are above the CCD inversion potential. $V_H$ and $V_I$ are selectively and sequentially applied first to the gate electrodes 84 to sequentially shift the various electrical charges down each channel to the channel's respective charge storage pixel 60 in the horizontal shift register and second to the gate electrodes 102a,b to sequentially shift the cumulative electrical charge for each channel to the amplifier 54. $V_L$ is applied to the gate electrodes 86a,b and 102a,b during the charge integration time interval, as will be described hereinafter. It should be appreciated that the dual phase driver of the present invention can readily be modified for single phase and/or multi-phase designs which include three or more phases.

Figure 4A:
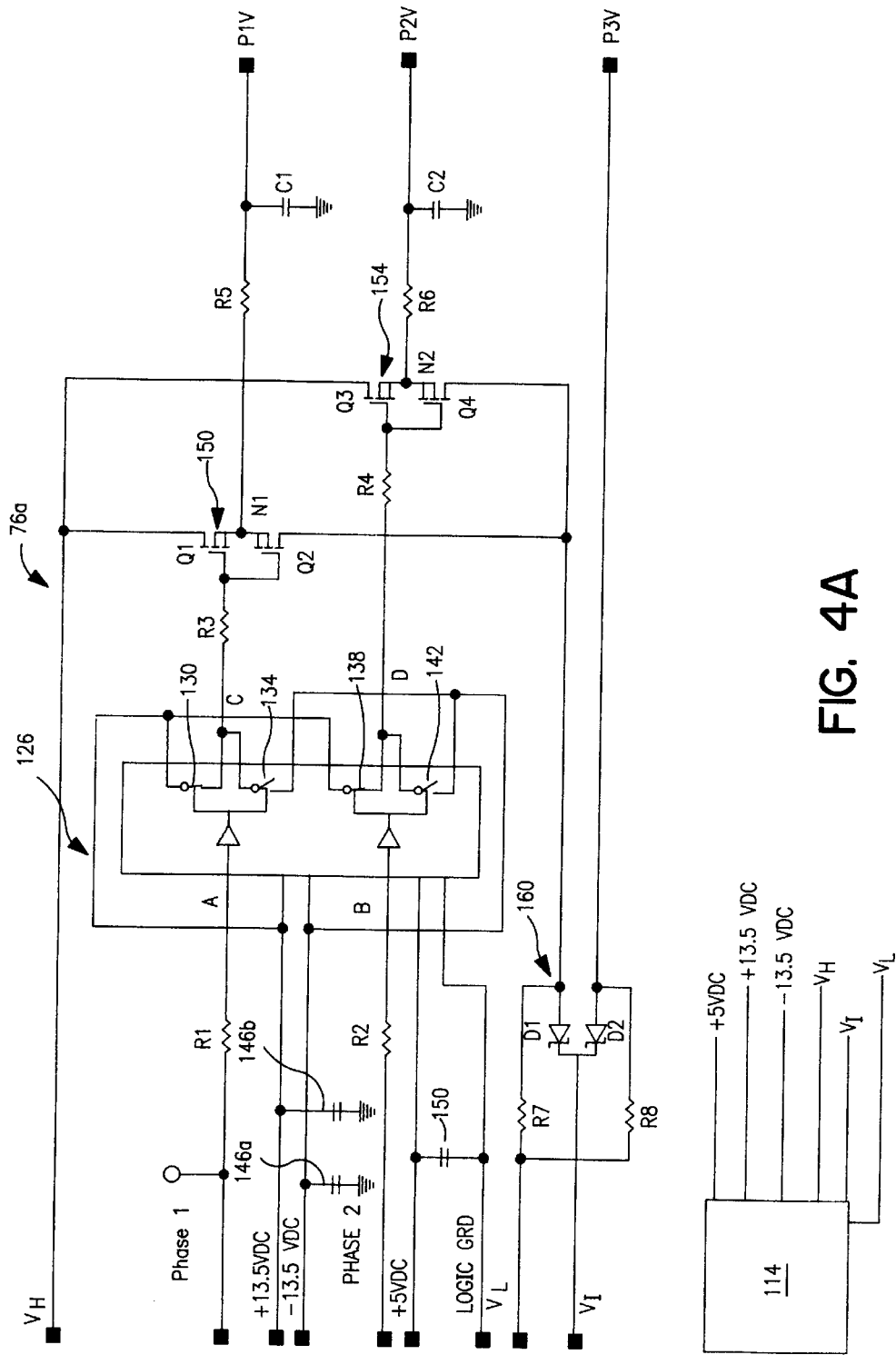
FIGS. 4A and 4B are schematic diagrams illustrating an embodiment for driving the vertical and horizontal shifting gate electrodes of a CCD which substantially reduces false charge accumulation in the CCD.
Figure 4B:
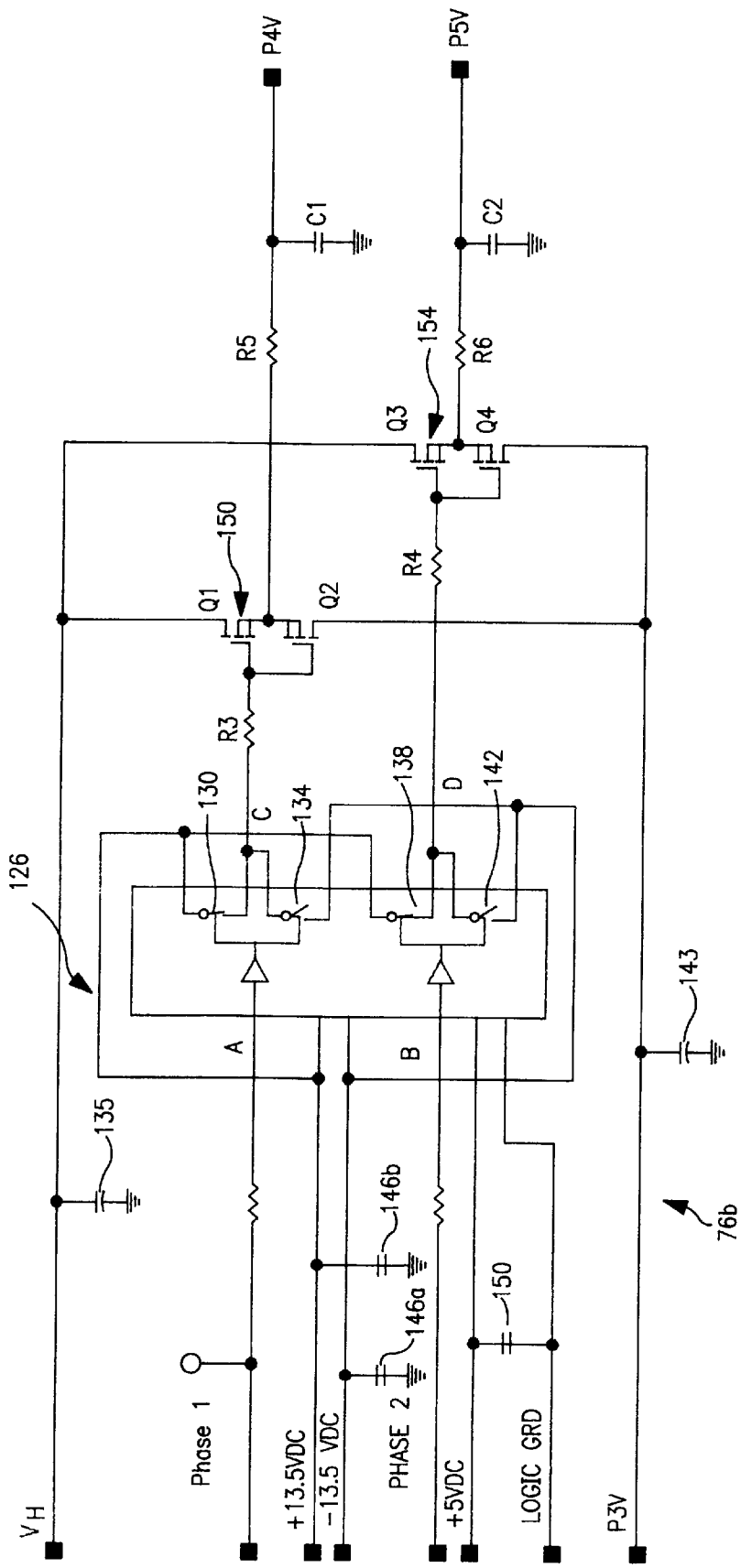
Figure 5A:
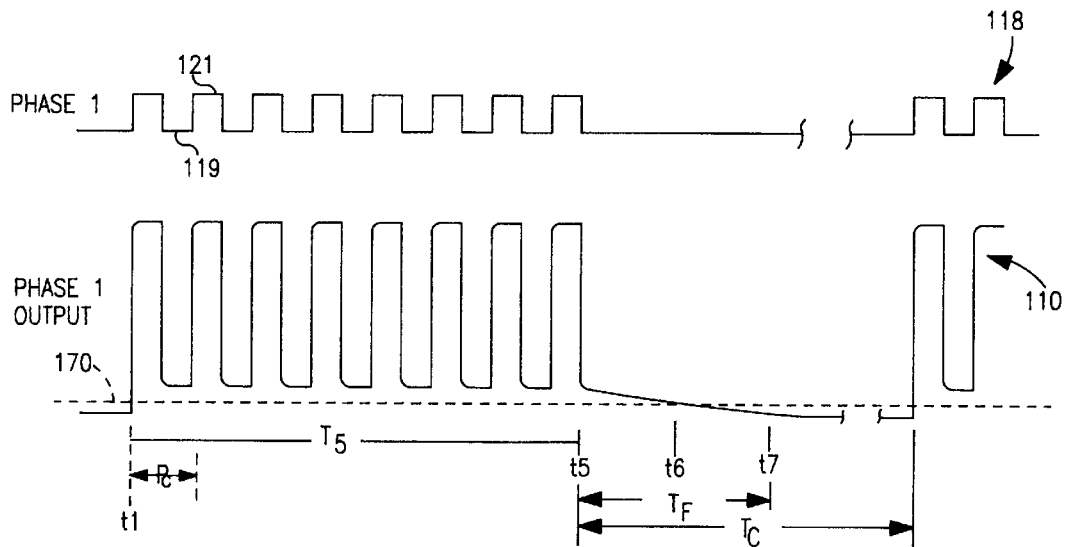
FIGS. 5A and 5B generally illustrate a digital clock and a shifting gate electrode voltage waveform generated by the circuit of FIGS. 4A and 4B.
Figure 5B:
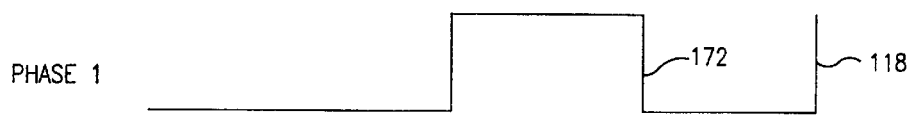
Figure 5B:
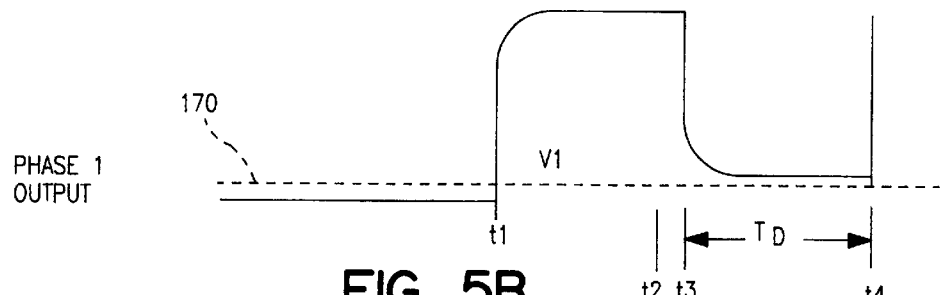
Figure 6:
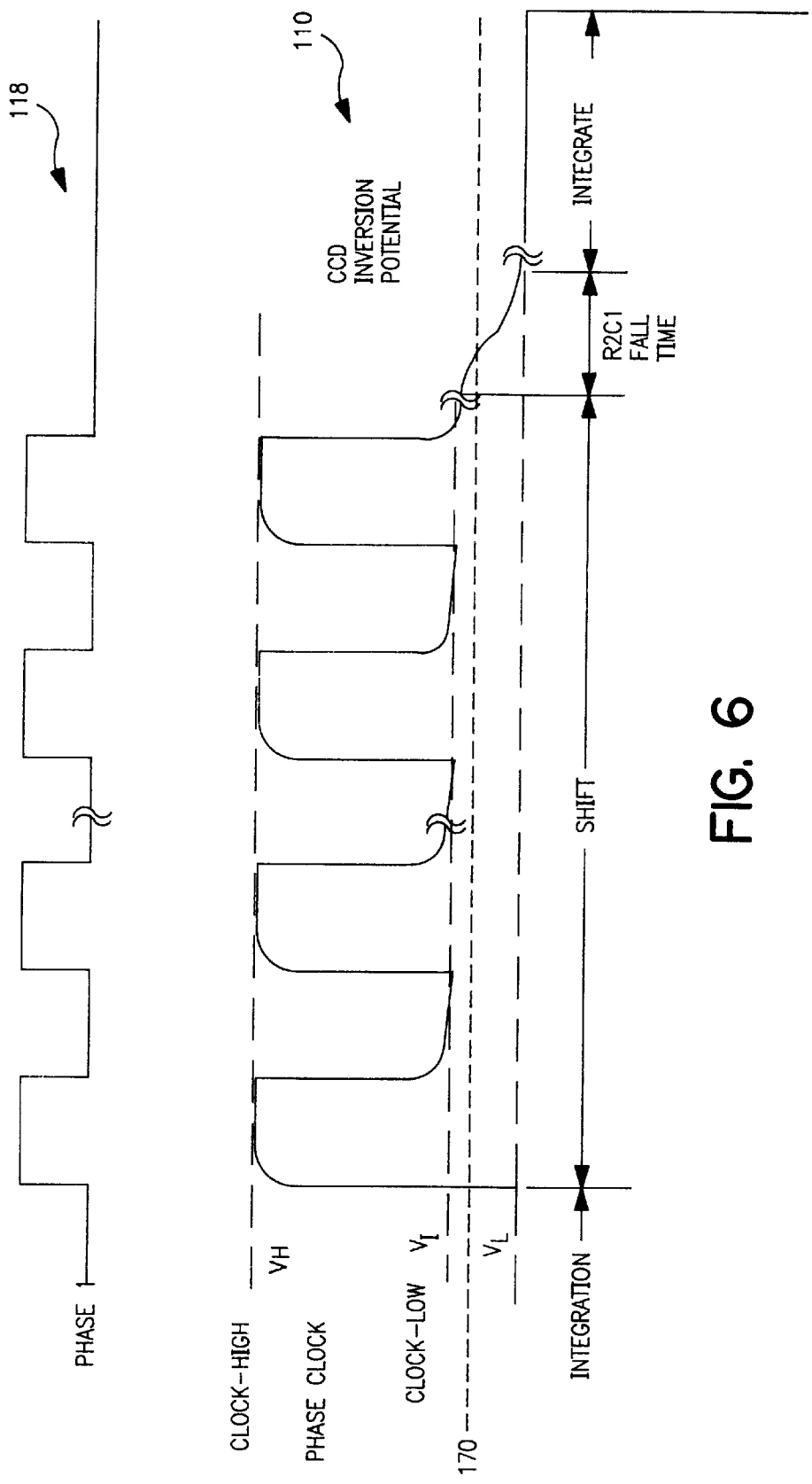
FIG. 6 generally illustrates an expanded portion of the waveform of FIG. 5A.
Figure 7:
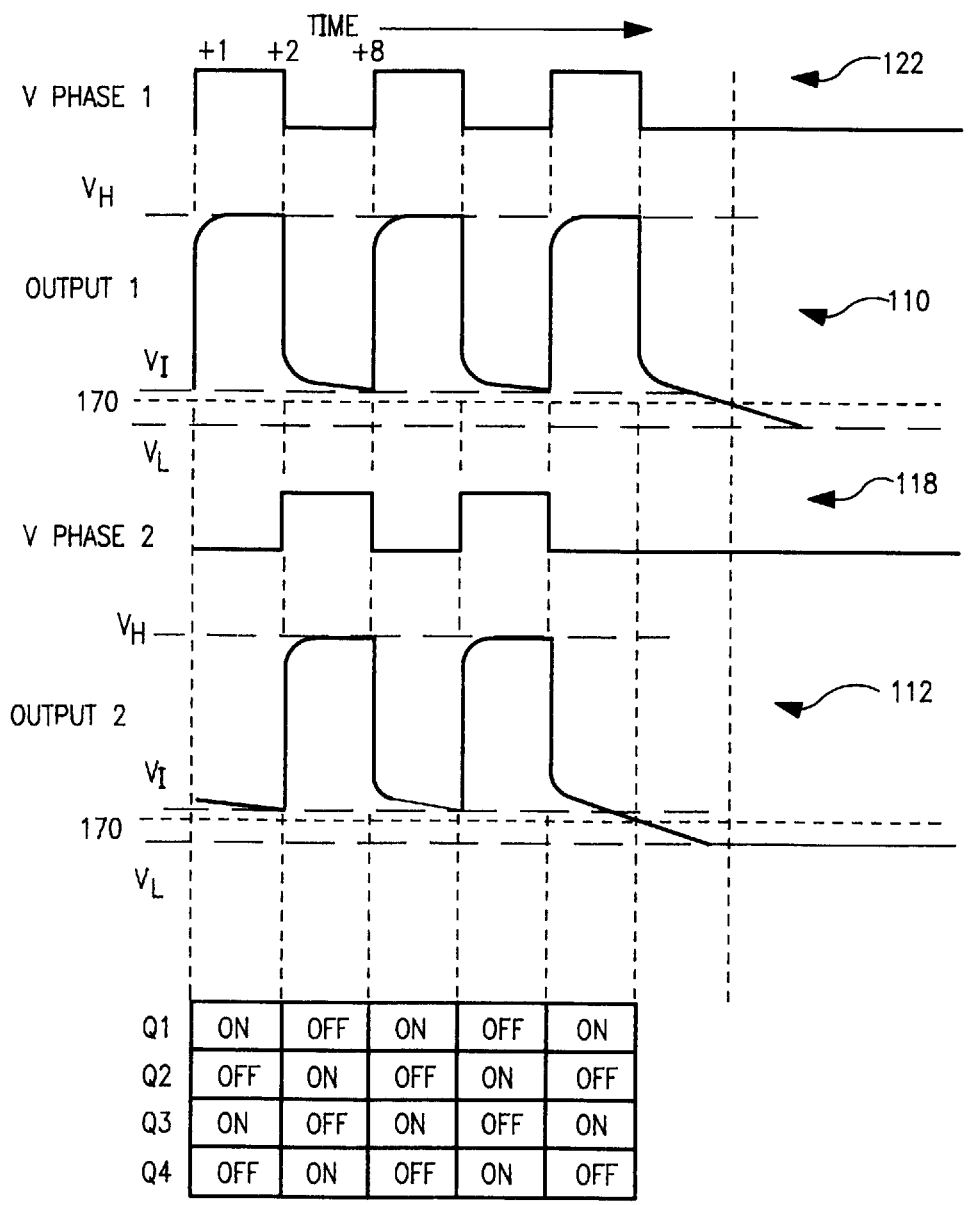
FIG. 7 generally illustrates waveforms relating output waveforms of the circuit shown in FIG. 4 to the on/off state of the MOS-FETs which form part of the circuit.

FIGS. 5–7 illustrate output waveforms 110, 112, one of which is applied by the circuit of FIG. 4A to each of the shifting gate electrodes 86a,b in FIG. 2 and by the circuit of FIG. 4B to each of the shifting gate electrodes 102a,b. Voltages $V_H$, $V_I$, and $V_L$ may be generated by a power supply 114, which also powers the remaining circuitry of the driver, or by other such means which are well known in the art.

In FIG. 4A, inputs denoted as phase 1 and phase 2 are provided by a phase clock circuit (not shown) (or other suitable timing device), which may be of a conventional configuration and which may form part of the phase clock driving means 76 (FIG. 2). The inputs receive timing signals that are typically square waves with relatively sharply defined edges. FIGS. 5–7 illustrate the phase 1 waveform 118 for the phase 1 timing signal and waveform 122 for the phase 2 timing signal. It should be noted that the phase 2 signal is essentially identical in appearance to the phase 1 signal except that the phase 2 signal is phase shifted by 180 degrees (i.e., inverted) as compared with the phase 1 signal. Each of the waveforms alternates between a lower baseline value 119 and a higher peak pulse value 121.

The phase 1 and 2 signals are converted into an output waveform, or drive signal, by being applied to drive inputs A and B, respectively, of a dual analog silicon switch 126, via input resistors R1 and R2. The latter resistors provide for proper triggering of the analog switch and for isolating the phase clock from the silicon switch. Internally to the silicon switch, inputs A and B each operate electrically isolated, separately actuable switch sections A and B, each switch section including normally open and normally closed contacts. Input A drives normally closed contacts 130 and normally open contacts 134 associated with an output C, while input B drives normally closed contacts 138 and normally open contacts 142 associated with an output D. One commercially available silicon switch, which is useful in the present application, is sold under the trade name "DG403"; however, other parts may be used or functionally equivalent parts may be readily adapted for use in this application. Switch 126 has the advantages of permitting fast switching (i.e., with rise and/or fall times as fast as 0.1 volts per nanosecond) and of providing a relatively symmetrical output waveform.

Continuing now with a description of the circuitry of FIG. 4A, previously mentioned power supply 114 provides silicon switch 126 with operating power. In the present example, voltages comprising +5 VDC, +13.5 VDC and –13.5 VDC are provided. Filter capacitors 146a and 146b are provided on the ±13.5 volt lines while filter capacitor 150 is provided on the +5 volt line in a well known manner. The ±13.5 voltages are also utilized to drive the contacts which make up switch sections A and B to shift the clock logic levels to these higher voltage levels. Specifically, +13.5 VDC is provided to normally closed contact 130 of section A and to normally closed contacts 138 of section B while –13.5 VDC is provided to normally open contacts 134 of section A and to normally open contacts 142 of section B. Thus, when normally closed contacts 130 and 138 are closed, switches A and B output +13.5 VDC at outputs C and D and, when normally open contacts 134 and 142 are closed, switches A and B output –13.5 VDC at outputs C and D. In operation, of course, the output of a particular switch section is dependent solely upon the respective voltage at inputs A or B. When either input A or B is driven by the pulse train portion of its respective phase output waveform, a corresponding pulse train is produced at either output C or D which deliver the output waveform to the CCD.

Still referring to FIG. 4A, output C of the silicon switch is connected to a first voltage follower 150, via resistor R3, comprised of an n channel MOS-FET Q1 and a p channel MOS-FET Q2. Output D is connected to a second voltage follower 154, via resistor R4, comprised of an n channel MOS-FET Q3 and a p channel MOS-FET Q4. Followers 150 and 154 are biased by the connection of $V_H$ to the drains of Q1 and Q3. The source of Q1 is connected with the source of Q2 at node N1 while the source of Q3 is connected with the source of Q4 at node N2. Node N1 drives the phase 1 output through a resistor R5 and node N2 drives the phase 2 output through a resistor R6. Further biasing arrangements will be described at an appropriate point below.

MOS-FETs are preferred in the present application for several reasons. First, due to their low input capacitance, they are generally fast enough to faithfully reproduce the sharp edges of the waveform provided from silicon switch 126. Second, MOS-FETs are capable of providing substantial output current suitable for driving the CCD plates while isolating the silicon switch from the phase 1 and/or 2 outputs. This capability is significant in that the silicon switch is only capable of sourcing up to approximately 100 milliamps. Capacitor C1 provides output filtering for the shifting signal P1V while capacitor C2 provides output filtering for the shifting signal P2V.

A wave shaping circuit is generally indicated by reference number 160. Wave shaping circuit 160 provides bias to the voltage followers using a resistor R7 connected between previously mentioned voltage source $V_L$ and the respective drain terminals of Q2 and Q4 while the cathodes of diodes D1 and D2 are connected with previously mentioned voltage source $V_I$. The anode of diode D1 is connected with the respective source terminals of Q2 and Q4 while the anode of diode D2 is connected to the phase clock driving means 76b as illustrated in FIG. 4B for providing bias to the voltage followers depicted in that Figure.

Referring to FIGS. 5–7 in conjunction with FIG. 4A and having generally described the circuitry which makes up the phase clock drive, a discussion of specific details of its operation will now be provided. The overall phase 1 output waveform 122 is illustrated in FIG. 7 while FIG. 5B provides an enlarged view of a single pulse of the shift pulse train during shift interval $T_S$. As mentioned previously, the waveform which is output by each phase is essentially identical except that the phase 2 signal is phase shifted by 180 degrees (i.e., inverted) with respect to the phase 1 signal. Therefore, only the phase 1 drive circuitry will be described in detail for purposes of brevity. However, FIG. 7 illustrates the phase clock drive inputs and outputs for phases 1 and 2 in view of the on/off states of MOS-FETs Q1 through Q4.

In operation, the level shifted phase 1 signal at output C of switch section A drives the gates of Q1 and Q2 through resistor R3. n channel MOS-FET Q1 turns on when its gate is driven high by the signal from the silicon switch while p channel MOS-FET Q2 is turned off by the same signal on its gate. Resistor R3 limits in-rush current to protect silicon switch 126 from excessive current draw from output C, for example, when MOS-FET Q1 begins switching to its on state after the integration interval at time t1 in FIG. 5B. As Q1 turns on, node N1 rises substantially to voltage $V_H$ which, of course, drives the phase 1 output substantially to $V_H$, dependent upon the CCD plate load resistance. Since Q2 is biased off by the output waveform from the silicon switch, wave shaping circuit 160 is inactive. At time t2, however, a trailing edge 172 of clock drive waveform 118 turns Q2 on and Q1 off. In accordance with the present invention at time t2, significant levels of current flow through Q2 from C1 and other extraneous circuit capacitances, such as the CCD, to activate the wave shaping circuit. Initially, diode D1 turns on and current flows through D1 to the $V_I$ source. Another discharge current path is provided to source $V_L$ by R7. However, the "on" resistance of D1 is less than the resistance of R7. Therefore, voltage is rapidly discharged through D1 to $V_I$. Generally, the rate of this initial discharge is primarily determined by the R5/C1 time constant. At time t3, the current from MOS-FET Q2 drops to a level which will not sustain conduction by D1 and which causes the latter to turn off. At the same time, the phase 1 output voltage reaches a value V1. During the succeeding interval $T_D$ until time t4, Q2 discharges through R7 to $V_L$. However, since the resistance of R7 is much greater than the resistance of RS, the RC time constant is then controlled by R7 and is increased by such a significant amount that the discharge over time period $T_D$ may be as little as five percent of its initial value V1 at time t3. Therefore, the phase 1 output voltage remains above CCD inversion potential 170 shown in FIGS. 5–7. As can be seen in FIG. 5A, during successive phase clock cycles (i.e., time interval $T_S$), the overall phase 1 output voltage remains continuously above the CCD inversion potential.

At time t5, shift interval $T_S$ ends. Thereafter, during interval $T_F$, the phase 1 output voltage continues to fall due to the R7/C1 time constant. At time t6, the phase 1 output voltage drops below the CCD inversion potential 170. The voltage then remains below the CCD inversion potential for the balance of integration interval $T_C$. The time period TF, from t5 to t7, during which the phase 1 output voltage drops substantially to $V_L$, and the time period from t5 to t6 are both much longer than a timing pulse "$P_C$." Because the integration interval, $T_C$, is considerably longer than the shifting interval $T_S$ (i.e., $T_S$ is typically no more than about 5% of $T_C$), $T_F$ can be significantly longer than a timing pulse yet at the same time significantly shorter than the integration interval. As will be appreciated, if the R7/C1 and the R5/C1 time constants are appropriately set, the phase output voltage will only drop below the inversion potential during the integration period, remaining above the inversion potential during the shifting interval, $T_S$.

The circuit of FIG. 4B drives the horizontal shifting gate electrodes. The common components of FIGS. 4A and 4B will not be described again in detail. As previously mentioned, this circuit operates at a higher frequency than the circuit of FIG. 4A which drives the vertical shift gate electrodes as determined by the driver circuitry. In the phase clock driving means circuit of FIG. 4B, the initial discharge at time t2 is controlled by the R5/C1 time constant with D2 in its on state. Once D2 turns off, the discharge rate is determined by an R8/C1 time constant since R8 is significantly greater than R5. Circuit operation is identical to that of circuit 76a with the exception of operating frequency and the use of R8 and D2. The output waveform shape can be modified, if desired, by adjusting the R5/C1 and R8/C1 time constants in the phase clock driving means circuit of FIG. 4B.

The operation of the spectrometer 20 employing the phase clock driving means circuitry of FIGS. 4A and 4B will now be described. Radiation 32 from the emitter 28 is passed through the gas sample 36. The radiation 32 is scattered by the gas sample 36 and a portion of the radiation 32, denoted as the scattered radiation 40, emerges from the gas sample 36 and contacts the CCD 52. The scattered radiation 40 is dispersed across the face of the CCD 52. The radiation contacts the radiation-sensitive substrate. The radiation generates electron-hole pairs in each of the radiation sensing means. The charge is permitted to accumulate in each of the radiation sensing means over the integration interval.

At the conclusion of the integration interval, the electric charge in each of the radiation sensing means 24 is transferred over the shifting interval to the horizontal shift register 64 by alternatively biasing the gate electrodes 84 with $V_I$ and $V_H$. With reference to FIGS. 2 and 7, during a first time interval between t1 and t2 the output P1V from the phase clock driving means 76a and therefore the gate electrodes 84 in electrical contact with output P1V are at an electrical potential $V_H$, and the output P2V and therefore the gate electrodes 84 in electrical contact with output P2V are at an electrical potential $V_I$. Accordingly, the potential wells biased with the electrical potential $V_I$ are shallow and the charges in the wells will transfer to the adjacent deeper potential wells biased with the electrical potential $V_H$ and those potential wells biased with the electrical potential $V_I$ will act as a barrier to the combination of electrical charges in adjacent radiation sensing means. In the time interval from t2 to t8, the output P1V and therefore the gate electrodes in electrical contact with output P1V are at an electrical potential $V_I$ and the output P2V and therefore the gate electrodes in electrical contact with output P2V are at an electrical potential $V_I$. Accordingly, the shallow potential wells biased with the electrical potential $V_I$ will transfer to the adjacent deeper potential wells biased with the electrical potential $V_H$ and those potential wells biased with the electrical potential $V_I$ will act as a barrier to the combination of electrical charges. In this manner, the electrical charge in each radiation sensing means is sequentially handed off by one potential well to the adjacent potential wells in a given column, (i.e., channel) until the cumulative electrical charge for the column is in the charge storage pixels 60 corresponding to the column. For example, the cumulative electric charge for the column C1 will be stored in the charge storage pixels 60a.

The cumulative electric charge from each column is transferred between the charge storage pixels using the vertically oriented shifting gate electrodes in the horizontal shift register. The electrodes are alternately biased to $V_H$ and $V_I$. The charges are thus serially transferred to the amplifier 54.

After the shifting interval is over, the gate electrodes bias radiation sensing means with $V_L$. Likewise, after the cumulative electrical charges are transferred to the signal processing means, the charge storage pixels are also biased with $V_L$. Electrical charge is again accumulated in each of the radiation sensing means in response to the scattered radiation 40. The preceding steps are repeated as many times as desired to analyze the gas sample 36.

Figure 8:
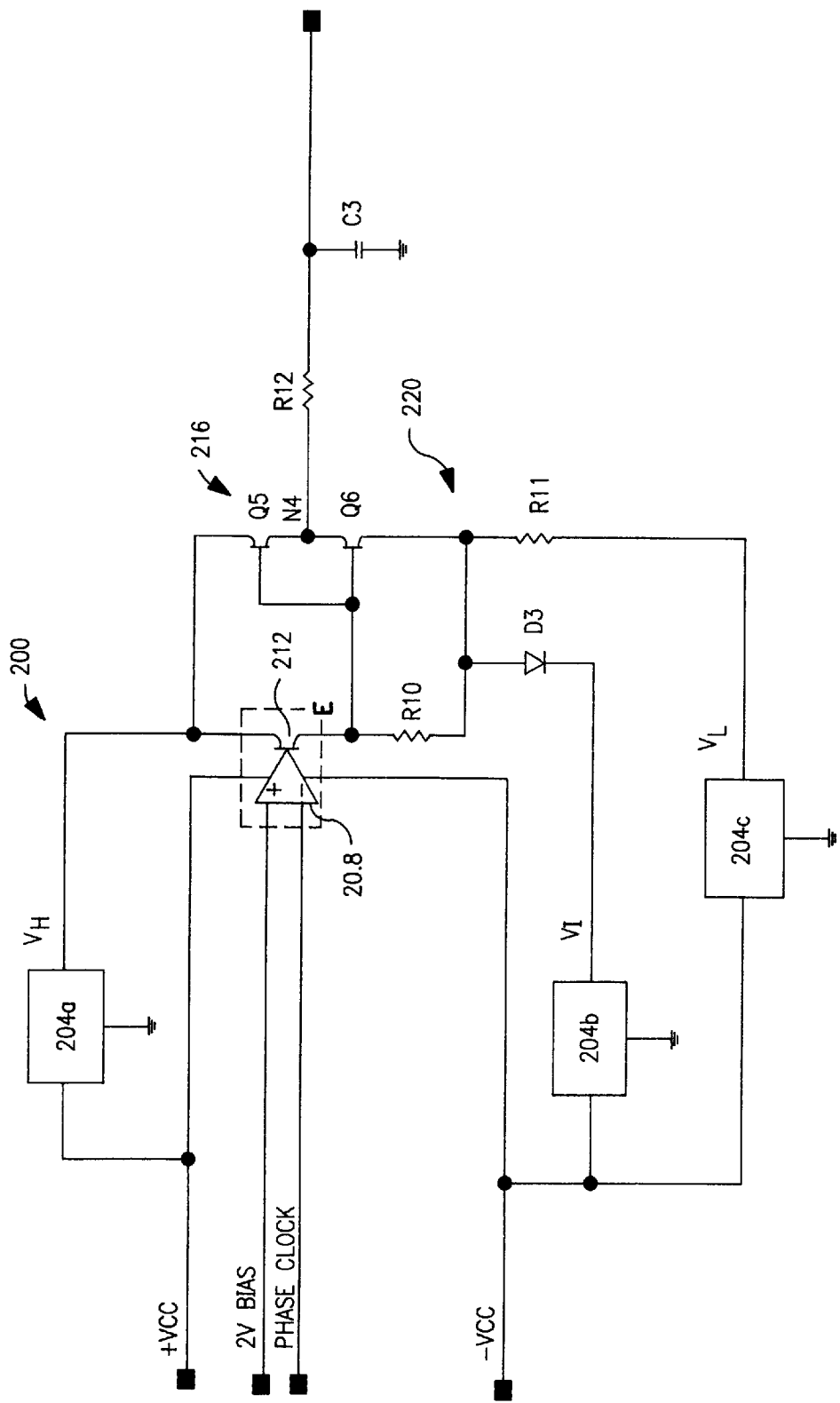
FIG. 8 is a schematic diagram illustrating another embodiment for driving the shifting gate electrodes of a CCD.

FIG. 8 depicts a single phase embodiment of another phase clock driving means circuit designed in accordance with the present invention and generally illustrated by reference number 200. Like the circuit shown in FIG. 4, circuit 200 utilizes voltages $V_H$, $V_I$ and $V_L$. These voltages may be generated by respective voltage regulators 204a, 204b and 204c. In that a voltage regulator is readily providable by one having ordinary skill in the art, detailed descriptions of these regulators will not be provided herein. Moreover, many types of regulators may be found to be suitable for the present application dependent upon factors such as, for example, output stability, noise rejection and the specific output voltage desired. The regulators may be powered by a readily providable overall power supply (not shown) which also powers the remaining circuitry of the driver. In one alternative, the power supply may readily be configured to provide these voltages to eliminate the need for separate voltage regulators. These modifications are within the capability of one having ordinary skill in the art.

The circuit 200 utilizes a comparator 208 incorporating an integral output transistor 212. The positive input of the comparator is connected to a 2 volt reference while its negative input receives the digital phase timing signal 118 illustrated by FIGS. 5 and 6. Bipolar transistors Q5 and Q6 comprise a high current voltage follower 216 interconnected in a manner which is well known in the art. Q5 is an npn transistor while Q6 is a pnp transistor. Voltage follower 216 and the output of comparator 208 are biased by $V_H$. A wave shaping circuit 220 provides biasing for the collector of Q6 and for the emitter of the output transistor of the comparator. Further, wave shaping circuit 220 includes a diode D3 having its anode connected with the collector of Q6 and also connected with the emitter of the output transistor of comparator 208 through resistor R10. The cathode of D3 is connected with source $V_I$. A resistor R11 is connected between $V_L$ and the collector of Q6.

The operation of the phase clock driving means circuit of FIG. 8 will now be described in detail. Since this single phase embodiment ideally outputs the same waveform as the outputs of the embodiment of FIG. 4 corresponding to waveform 118, the waveforms of FIGS. 5 and 6 will continue to serve to facilitate a basic understanding of circuit operation. However, it is to be understood that the present embodiment will typically output a phase drive waveform with slower rise and fall times as compared with the embodiment of FIG. 4. These variations result from the use of relatively slower components such as, for example, comparator 208 and bipolar transistors Q5 and Q6. Comparator 208 provides a high input impedance so as not to load the digital phase clock circuitry while, at the same time, providing sufficient drive current to voltage follower 216 and converting the logic level input of the timing signal to the higher voltages which operate comparator 208. Voltage follower 216 is capable of providing significant output current from node N4 which drives the CCD through output resistor R12. Output filtering is provided by a capacitor C3.

During operation, comparator 208 outputs a waveform corresponding to the digital phase timing signal on its negative input. The level shifted signal output E of comparator 208 drives the bases of Q5 and Q6. npn transistor Q5 turns on when its base is driven high by the signal from the comparator while pnp transistor Q6 is turned off by the same signal on its base. As Q5 turns on, node N4 rises substantially to voltage $V_H$ which drives the phase output substantially to $V_H$, dependent upon the CCD plate load resistance. During the Q5 turn-on and while it remains on, Q6 is biased off by the output waveform from the comparator. At time t2, however, trailing edge 172 of clock drive waveform 118 changes the state of the comparator which, thereafter, turns Q6 on and Q5 off.

In accordance with the present invention at time t2, significant levels of current flow through Q6 from C3 and the CCD capacitance so as to activate the wave shaping circuit. Initially, diode D3 turns on and current flows through D3 to the $V_I$ source which rapidly pulls the collector of Q6 to one diode drop above $V_I$. Another discharge current path is provided to source $V_L$ by R11. However, the "on" resistance of D3 is far less than the resistance of R11. Therefore, voltage is rapidly discharged through D3 to $V_I$ at a rate that is primarily determined by the R12/C3 time constant. At time t3, the discharge current reduces to a value which causes D3 to turn off. At the same time, the phase output voltage reaches value V1. During the succeeding interval $T_D$ until time t4, Q6 discharges through R11 to $V_L$. However, since the resistance of R11 is much greater than the resistance of R12, the RC time constant is then controlled by R11 and is increased by such a significant amount that the discharge over time period $T_D$ may be as little as five percent of its initial value V1 at time t3. Therefore, the phase output voltage remains continuously above the CCD inversion potential for the duration of the vertical or horizontal shift pulses, as in the previously described embodiment.

At time t5, shift interval $T_S$ ends. Thereafter, during interval $T_F$, the phase output voltage continues to fall due to the R11/C3 time constant. At time t6, the output voltage drops below the CCD inversion potential 170. The voltage then remains below the CCD inversion potential 170 for the balance of integration interval $T_C$. If the RC time constants R12/C3 and R11/C3 are properly set, the phase output voltage will drop below the inversion potential following the onset of the integration interval, but yet will remain above the inversion potential during the shift interval, $T_S$. Although the circuit of FIG. 8 does not produce an output waveform having the symmetry of the output waveform produced by the circuit of FIG. 4, the comparator of FIG. 8 provides at least one advantage in that it provides higher common mode rejection than silicon switch 126 of FIG. 4. This advantage may be significant in reduction of digital noise. As will be appreciated, this single driver circuit can be readily modified in any number of ways which apply the concepts of the present invention. Additionally, the circuit is readily adaptable for use in multi-phase applications.

While various embodiments of the present invention have been described in detail, it is apparent that modifications and adaptations of those embodiments will occur to those skilled in the art. For example, it should be appreciated that the waveforms and associated generation circuitry, as taught by the present invention, may be modified in an unlimited number of ways within the framework of the teachings of the present invention. These variations are all considered to fall within the scope of the present invention provided only that the false charge reduction concepts as taught herein are applied. Therefore, it is to be expressly understood that such modifications and adaptations are within the spirit and scope of the present invention, as set forth in the following claims.

What is claimed is:

1. A driving circuit for use in driving a charge coupled device (CCD) having a predetermined CCD inversion potential, said driving circuit comprising:

means for receiving a timing signal, said timing signal having a first portion and a second portion, wherein said first portion includes a train of timing pulses having a peak pulse value and a baseline value and said second portion includes a substantially constant magnitude;

means for converting said timing signal into an output waveform having a first portion that maintains a shifting potential during shifting, wherein an absolute value of said shifting potential exceeds an absolute value of said predetermined CCD inversion potential, and a second portion that has an integration potential during integration wherein an absolute value of said integration potential is less than said absolute value of said predetermined CCD inversion potential; and coupling means for use in delivering said output waveform to said CCD, wherein said first portion of said output waveform is operative for shifting information through said CCD during a shifting interval and said second portion of said output waveform is operative for biasing said CCD during an integration interval.

2. The circuit of claim 1, wherein:

said shifting potential includes a first and a second voltage level and the absolute value of said first voltage level is greater than the absolute value of said second voltage level.

3. The circuit of claim 1, wherein:

said second portion has a substantially constant integration potential value.

4. The circuit of claim 1, wherein:

said substantially constant magnitude value of said second portion of said timing signal is substantially equal to said baseline value of said first portion of said timing signal.

5. The circuit of claim 1, wherein:

said means for converting includes wave shaping means having a variable time constant.

6. The circuit of claim 5, wherein:

said wave shaping means switches between a relatively short time constant and a relatively long time constant based on the magnitude of an applied signal.

7. The circuit of claim 5, wherein:

said shifting potential includes a first and a second voltage level;

said means for converting includes energy storing means and means for applying said first voltage level to said energy storing means each time said timing signal reaches said peak pulse value so that said energy storing means charges to substantially said first voltage level.

8. The circuit of claim 7, wherein:

said means for converting includes means for electrically connecting said energy storing means to said wave shaping means each time said timing signal reaches said baseline value so that said energy storing means may discharge through said wave shaping means.

9. The circuit of claim 8, wherein:

said wave shaping means has a relatively short time constant during a first time interval after said means for connecting connects said energy storing means to said wave shaping means and a relatively long time constant for a second, subsequent time interval.

10. The circuit of claim 9, wherein:

said wave shaping means switches from said relatively short time constant to said relatively long time constant as said potential across said energy storing means transitions between said first voltage level and said second voltage level during discharge.

11. The circuit of claim 9, wherein:

said wave shaping means switches from said relatively short time constant to said relatively long time constant when said potential across said energy storing means is approximately equal to said second voltage level.

12. The circuit of claim 8, wherein:

said wave shaping means includes a diode operatively connected to said means for coupling so that said diode is biased "on" when said means for coupling is coupling said energy storing device and said wave shaping means and said potential across said energy storing device exceeds a sum of said second voltage level and a potential across said diode while biased "on."

13. The circuit of claim 12, wherein:

said wave shaping means includes resistance means having a predetermined resistance operatively connected between said means for connecting and a source having a potential substantially equal to said substantially constant potential value of said second portion of said output waveform.

14. The circuit of claim 13, wherein:

said predetermined resistance of said resistance means is greater than a resistance of said diode while said diode is biased "on."

15. The circuit of claim 8, wherein:

said wave shaping means provides multiple discharge paths to said energy storing means, wherein a first of said discharge paths provides a relatively long, constant discharge time constant and a second of said discharge paths provides a variable discharge time constant which transitions said relatively long discharge time constant as said energy storing means discharges.

16. The circuit of claim 15, wherein:

said second discharge path has a relatively short discharge time constant when said means for connecting first connects said energy storing means to said wave shaping means.

17. The circuit of claim 9, wherein:

said train of timing pulses in said first portion of said timing signal has a substantially constant period between successive timing pulses; and said substantially constant period of said timing pulses is small compared to the length of said second portion of said timing signal.

18. The circuit of claim 17, wherein:

said relatively long time constant is greater than said substantially constant period between successive timing pulses and is less than said length of said second portion of said timing signal.

19. A method for driving a CCD having a plurality of potential wells, at least one of the potential wells holding an electrical charge, and a predetermined CCD inversion potential, the method comprising:

maintaining during shifting a shifting potential in the plurality of potential wells to successively shift the electrical charge among the plurality of potential wells, wherein the absolute value of the shifting potential exceeds the absolute value of the predetermined CCD inversion potential; and maintaining, substantially throughout integration, an integration potential in the plurality of potential wells, wherein the absolute value of the integration potential is less than the absolute value of the predetermined CCD inversion potential.

20. The method of claim 19, wherein the shifting potential includes a first and a second voltage level and the first voltage level exceeds the second voltage level and the maintaining during shifting step comprises:

first applying in response to a first timing pulse, the first voltage level to a first set of the plurality of potential wells and the second voltage level to a second set of potential wells, wherein the potential wells in the first set differ from the potential wells in the second set, to shift the electrical charge from a potential well in the second set to a potential well in the first set; and second applying in response to a second timing pulse following the first timing pulse, the first voltage level to the second set and the second voltage level to the first set to shift the electrical charge from the potential well in the first set to a potential well in the second set.

21. In a system for monitoring one or more components in a gas spectrometer comprising:

a plurality of radiation sensing means for generating, during an integration interval, electrical charges in proportion to radiation received by each said radiation sensing means during the integration interval, wherein each said radiation sensing means includes a first radiation sensing means for generating a first electrical charge in response to a first portion of the received radiation and a second radiation sensing means for generating a second electrical charge in response to a second portion of the received radiation and wherein the plurality of radiation sensing means has a predetermined CCD inversion potential;

a charge storage pixel for holding the first and second electrical charges;

coupling means for transferring, during a shifting interval, the first and second electrical charges to the charge storage pixel in response to an electrical potential; and phase clock driving means for providing the electrical potential to the coupling means;

wherein, during the integration interval, the phase clock driving means provides an integration potential to the coupling means, the absolute value of which is less than the absolute value of the predetermined CCD inversion potential and, during the shifting interval, the phase clock driving means provides a shifting potential to the coupling means, the absolute value of which is more than the absolute value of the predetermined CCD inversion potential.

22. The spectrometer of claim 21, wherein the radiation has a plurality of wavelengths and a first plurality of the radiation sensing means correspond to a first predetermined portion of the wavelength range and a second plurality of the radiation sensing means correspond to a second predetermined portion of the wavelength range, the first predetermined portion differing from the second predetermined portion, and the CCD includes a first and a second charge storage device, the first charge storage device corresponding to the first predetermined portion of the wavelength range and the second charge storage device corresponding to the second predetermined portion of the wavelength range.

23. The spectrometer of claim 21, wherein the shifting potential includes a first voltage level and a second voltage level and the phase clock driving means includes at least one switching means for switching between the first and second voltage levels at frequencies of no less than about 50 KHz.

24. The spectrometer of claim 21, wherein the phase clock driving means includes a timing means for providing timing pulses over a plurality of discrete timing intervals within the shifting interval, the timing pulses controlling the application of the first and second voltage levels by the switching means.

25. The spectrometer of claim 24, wherein the phase clock driving means includes a voltage pulldown means for decreasing the electrical potential from the shifting potential to the integration potential, the voltage pulldown means having a time constant sufficient to cause the electrical potential to change from the shifting potential to the integration potential over a time interval that is longer than each of the timing pulses.

26. The spectrometer of claim 25, wherein the time interval is less than the integration interval.

27. The spectrometer of claim 21, wherein the shifting interval is no more than about 5% of the integration interval.

28. The spectrometer of claim 23, wherein during a timing pulse the electrical potential is at the first voltage level and between timing pulses the electrical potential is at the second voltage level.

* * * * *